US 9,454,515 B1

(12) United States Patent
Jain

(10) Patent No.: US 9,454,515 B1
(45) Date of Patent: Sep. 27, 2016

(54) CONTENT BROWSER SYSTEM USING GRAPHICS COMMANDS AND NATIVE TEXT INTELLIGENCE

(71) Applicant: Amazon Technologies, Inc., Reno, NV (US)

(72) Inventor: Saral Jain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 14/306,981

(22) Filed: Jun. 17, 2014

(51) Int. Cl.
*G06F 17/00* (2006.01)
*G06F 17/22* (2006.01)

(52) U.S. Cl.
CPC .................. *G06F 17/2247* (2013.01)

(58) Field of Classification Search
CPC .............. H04L 67/04; H04L 67/2823; G06F 17/30905
See application file for complete search history.

(56) References Cited

U.S. PATENT DOCUMENTS

| | | | |
|---|---|---|---|
| 7,310,769 B1* | 12/2007 | Dash ................... | G06F 17/2217 715/269 |
| 2008/0222273 A1* | 9/2008 | Lakshmanan ..... | G06F 17/30247 709/219 |
| 2014/0281896 A1* | 9/2014 | Wiitala ............... | G06F 17/2247 715/234 |

* cited by examiner

*Primary Examiner* — Asher Kells
(74) *Attorney, Agent, or Firm* — Knobbe, Martens, Olson & Bear, LLP

(57) ABSTRACT

Server systems are disclosed that receive content requests and respond with hardware-independent graphics commands instead of, or in addition to, unprocessed content items. The server systems can also generate text information regarding text in the requested content items, and provide the text information to user devices so that the user devices can have knowledge of the text in the content item. The user device can use the text information to handle user interactions with the content item, including copy, paste and search commands and other similar commands. Accordingly, the hardware-independent graphics commands-based representation may provide text interactivity and effects not otherwise available to content representations based on graphics commands or images of content.

24 Claims, 6 Drawing Sheets

CONTENT BROWSER SYSTEM USING GRAPHICS COMMANDS AND NATIVE TEXT INTELLIGENCE

BACKGROUND

Computing devices can retrieve and display network-accessible content pages, such as web pages, that are hosted by or otherwise provided by other computing devices. In a common scenario, the computing device that requests and displays the content may be referred to as the client computing device or user computing device, and the computing device that hosts or otherwise provides the content may be referred to as the server computing device.

The content pages retrieved and displayed by user computing devices may include text, images, video, executable code, and the like. When the content pages include text, users can often perform interactive operations on the text, such as initiating automatic searches for specific text with the page. When the search text is found within the page, it is typically highlighted for the user. When content pages include images of text (e.g., images with rasterized text) the text in the images may not be searchable. Some servers provide content searching capabilities in such cases by allowing users to submit search terms. The servers can then highlight the search terms in an updated version of an image, and provide the updated image with the highlighted text to the client devices.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
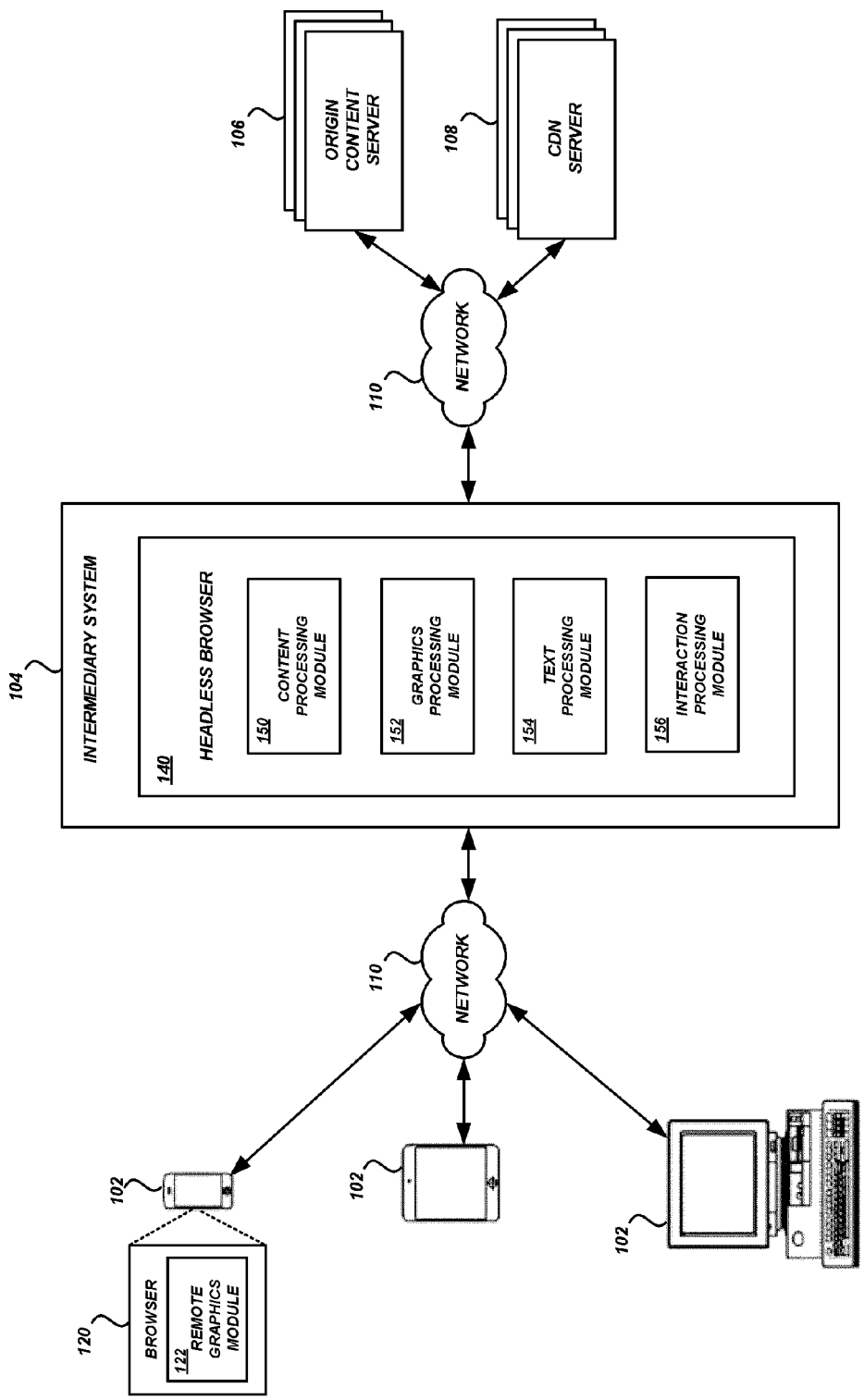
FIG. 1 illustrates a content delivery environment with an intermediary system that processes content and generates hardware-independent graphics commands for execution on user devices according to some embodiments.

The present disclosure involves an architecture in which the functions of a network content browsing system (e.g., a "web browser" application) are distributed among a browser component running on a server and a browser component running on a user device. The browser component running on the server (also referred to as the "server-side browser") can obtain content and generate graphics commands that can be executed by the browser component running on the user device (also referred to as the "client-side browser") to display a representation of the content. The graphics commands may not be markup commands, such as Hypertext Markup Language ("HTML") commands, but may instead be hardware-independent graphics commands for painting to a display, such as vector graphics commands that are not device-specific or graphics processing unit ("GPU") specific (e.g., they can be executed on a variety of different devices and in different operating environments as long as the appropriate graphics library is present). For example, the hardware-independent graphics commands may be software-based graphics commands targeted at a particular multi-platform software library or application programming interface ("API") that provides abstraction from specific hardware requirements. Examples of server-side browsers that generate hardware independent graphics commands and provide them to client-side browsers in lieu of conventional content files are described in commonly-owned U.S. patent application Ser. No. 14/285,477, titled "Distributed Content Browsing System Using Transferred Hardware-Independent Graphics Commands" and filed on May 22, 2014, the disclosure of which is hereby incorporated by reference. Hardware-independent graphics commands may be used by a client-side browser to present a complete or substantially complete visual representation of a content page, including text and images. However, users may not be able to interact with the text in the representation of the content page (e.g., perform copy, paste, and search operations) because the response sent to the user device—the hardware-independent graphics commands—may not include the text itself. Rather, the graphics commands cause display of graphical image representations or "glyphs" that correspond to the individual characters of text on the content page. Therefore, a client-side browser that has received hardware-independent graphics commands in lieu of conventional content files may not have knowledge of the text (e.g., the actual letters, numbers, and other textual characters) that corresponds to the displayed glyphs.

Some aspects of the present disclosure relate to providing information regarding textual characters that correspond to images or other non-textual graphical representations of text displayed in a representation of content page. The non-textual graphical representations of text may be images or graphics (e.g., glyphs, rasterized images, vector graphics, etc.) of the visual symbols for particular textual characters. However, the non-textual graphical representations of text may not be treated by or recognized by a computing device as a data type or data structure for character strings or individual characters (e.g., "string," "char," "char[ ]," and equivalent data types and structures in many programming languages). Computing devices may use various operations for text manipulation/searching/regular expression matching/etc. on data internally represented as a data type or data structure recognized as text, such as an array of "char" data types used to store ASCII or Unicode values for a particular string of characters. Those same text-based operations may not be used with graphical representations of the text, because the graphical representations are typically images or vector graphics that happen to be used to display text symbols. As such, the graphical representations of text may be internally represented using data structures for image or graphics data, rather than data types or data structures on which the computing device may perform text manipulation/searching/regular expression matching/etc.

Providing additional information regarding the text (e.g., information represented using data types or data structures for character strings or individual characters) to the client-side browser can facilitate user interaction with the text (e.g., copy, paste, search, etc.) that would not be possible with only images or other non-textual graphical representations of text. In some embodiments, a server-side browser or some other server-side system may generate an invisible textual overlay in addition to the hardware-independent graphics commands. The textual overlay can include a copy of the text that corresponds to the glyphs displayed by execution of the hardware-independent graphics commands. In addition, the text in the textual overlay may be formatted such that it can be searched, added to a system "clipboard" in response to a user "copy" command, etc. For example, the text in the textual overlay may be Unicode or ASCII text arranged such that the location of a given portion of text corresponds to the location of the corresponding glyph(s). When a user attempts to highlight or otherwise interact with text displayed on the screen, the operating system (or some other module or component) can provide the screen coordinates or some other positional information regarding the user interaction to the client-side browser. The client-side browser can use the positional information to identify the text at the location of user interaction to, e.g., copy the text to the system clipboard. The client-side browser can also use the positional information to apply a visual effect to the display at those coordinates (e.g., apply highlighting). In this way, user interactions with the displayed images of text can appear to produce results that are similar or identical to those produced for user interactions with content pages that include native text received and rendered locally.

Additional aspects of the present disclosure relate to providing text interaction features using hardware-independent graphics commands without the use of a separate textual overlay or other layer that includes the text of the content page. In some embodiments, hardware-independent graphics commands can generate a visual representation of glyph identified by a particular glyph identifier. When a user interacts with representation of a content page generated by the hardware-independent graphics commands, the client-side browser can identify the particular graphics commands that correspond to the coordinates associated with the user interaction. The particular graphics commands may include or reference glyph identifiers for the glyphs to be displayed at those coordinates. A cross reference or conversion function may be used to determine which textual character (e.g., which Unicode letter, number, or symbol) is represented by the glyph(s) at those coordinates. In this way, the text at the coordinates that correspond to the user interaction can be, e.g., copied onto a temporary "clipboard" for future pasting. In addition, hardware-independent graphics commands can be executed to alter the display of the glyphs at the coordinates that correspond to the user interaction, such as to apply highlighting.

Further aspects of the present disclosure relate to searching for text within a content page that is displayed using hardware-independent graphics commands. In conventional browser applications that obtain copies of content files (e.g., copies of the resources that define the content, such as HTML files, images, etc.) rather than graphics commands, users can search for text on a page because the browser application has rendered the text from the content files, and therefore has knowledge of the display location of each piece of text. In browser applications that obtain graphics commands in lieu of the resources that define the content page, such searching may be difficult because the browser application does not have direct knowledge of the display location of each piece of text. In some embodiments, when a textual overlay is provided with the hardware-independent graphics commands, the client-side browser can search the textual overlay and obtain coordinates for any matches. In other embodiments, when a textual overlay is not provided, the client-side browser can inspect the graphics commands for the page and determine the textual content at each coordinate or range of coordinates in advance of searching (e.g., before, during or shortly after the rendering process). When a user subsequently searches for specific pieces of text, the client-side browser can search the previously generated listing, mapping, hash table, etc. to obtain coordinates for any matches.

Although aspects of the embodiments described in the disclosure will focus, for the purpose of illustration, on a distributed browsing system with separate server-side browser and client-side browsers designed specifically to work in conjunction with one another, one skilled in the art will appreciate that the techniques disclosed herein may be applied to any number of services, processes, or applications. In some embodiments, an existing browser application that runs on a user device may be configured to receive hardware-independent graphics commands from a server in lieu of unprocessed content files. For example, a browser plug-in or extension may be installed on a user device to facilitate communication with a server-side browser, receive hardware-independent graphics commands, and execute the commands, thereby bypassing the parsing and rendering processes that would normally be performed by the client-side browser. In some embodiments, browsers executing on user devices may be designed to receive either conventional content files or hardware-independent graphics commands (or a combination thereof). For example, the browser may determine whether to request content files or hardware-independent graphics commands based on current conditions and performance metrics, data regarding prior browsing sessions, or the like. Alternatively, or in addition, an intermediary system may determine whether to provide content files or hardware-independent graphics commands based on current conditions, performance metrics, prior browsing sessions, or the like.

Furthermore, although the examples in the present disclosure focus on the generation, transmission, and execution of Skia commands, the systems and processes herein may be used with any hardware-independent graphics commands or other non-device-specific, non-GPU-reliant graphics commands as long as both the client browser (or browser extension) and headless browser each have access to the necessary graphics processing components and libraries.

Various aspects of the disclosure will now be described with regard to certain examples and embodiments, which are intended to illustrate but not limit the disclosure.

System Components

FIG. 1 illustrates an example network environment in which features can be implemented for processing content pages on an intermediary system and generating hardware-independent graphics commands for execution by a user device. The network environment shown in FIG. 1 includes various user devices 102, an intermediary system 104, and various content sources, including origin content servers 106 and content delivery network ("CDN") servers 108. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a client-side browser 120 to communicate via the network 110 with other computing systems, such as the intermediary system 104 or content sources 106 and 108, in order to request and display content.

Illustratively, a user may use a client-side browser 120 to request network-accessible content (e.g., content pages, images, video, etc.) hosted or provided by a content source, such as an origin content server 106 or a CDN server 108. The user device 102 or client-side browser 120 may be associated with the intermediary system 104 or otherwise configured to request the content through, and receive hardware-independent graphics commands from, the intermediary system 104 rather than communicating directly with the content source. The client-side browser 120 may include a remote graphics module 122 that receives remotely-generated hardware-independent graphics commands, such as Skia commands generated by the intermediary system 104. The remote graphics module 122 (or some other module of the client-side browser 120) can execute the remote-generated hardware-independent graphics commands to display a representation of the requested content on the user device 102. Advantageously, the remote graphics module 122 may facilitate the display of graphical representations of requested content on the user device 102 without requiring the user device 102 to receive content files (e.g., HTML files, JPEG images, etc.) directly or indirectly from content sources 106 and 108. In addition, the remote graphics module 122 or some other module or component may facilitate user interactions with representations of text displayed by the client-side browser 120 similar to interactions that may be performed using browser that obtain and render content files such as HTML files.

In some embodiments, the browser application running on the user device 102 may be a conventional web browser that is not specifically designed or configured to execute remotely-generated graphics commands and other display commands. For example, the browser may use or otherwise be associated with a remote graphics module 122 that is not integrated with the browser, such as a browser add-in or extension. In some embodiments, applications other than a browser may include or use a remote graphics module 122 (or some similar module) to execute graphics commands generated by an intermediary system 104. For example, content aggregators or other specialized content display applications for mobile devices (e.g., Flipboard) may utilize a remote graphics module 122.

The intermediary system 104 can be a computing system configured to retrieve content on behalf of user devices 102 and generate hardware-independent graphics commands for execution by the user devices 102. For example, the intermediary system 104 can be a physical server or group of physical servers that may be accessed via the network 110. In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a server-side browser 140 or a "headless browser." A server-side browser 140 does not (or is not required to) cause display of content by a graphical display device of the server on which the server-side browser 140 is executing. In some embodiments, the server-side browser 140 can provide hardware-independent graphics commands to separate user devices 102. Illustratively, the server-side browser 140 may obtain requested content from an origin content server 106 and/or CDN server 108, obtain additional items (e.g., images and executable code files) referenced by the requested content, execute code (e.g., JavaScript) that may be included in or referenced by the content, generate hardware-independent graphics commands to display a graphical representation of the content, and transmit the hardware-independent graphics commands to the user device 102. By performing some or all of these operations on the intermediary system 104 rather than the user device 102, the substantial computing resources and high-speed network connections typically available to network-based server systems may be leveraged to perform the operations much more quickly.

The server-side browser 140 may include various modules to provide the functionality described above and in greater detail below. For example, the server-side browser 140 may include: a content processing module 150 that parses content files and generates a DOM tree and/or render tree representation of the content; a graphics processing module 152 that receives the DOM/render tree representation and generates hardware-independent graphics commands (e.g., Skia commands) to render a graphical representation of the content on a user device 102; a text processing module 154 that generates textual overlays or otherwise provides information regarding the text of a content page; and an interaction processing module 156 that communicates with the client-side browser 120 to receive information regarding interactions with the content on the user device 102 and to update the graphical representation of the content if necessary. In some embodiments, a server-side browser 140 may include additional or fewer modules than those shown in FIG. 1.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Interacting with Images of Text

Figure 2:
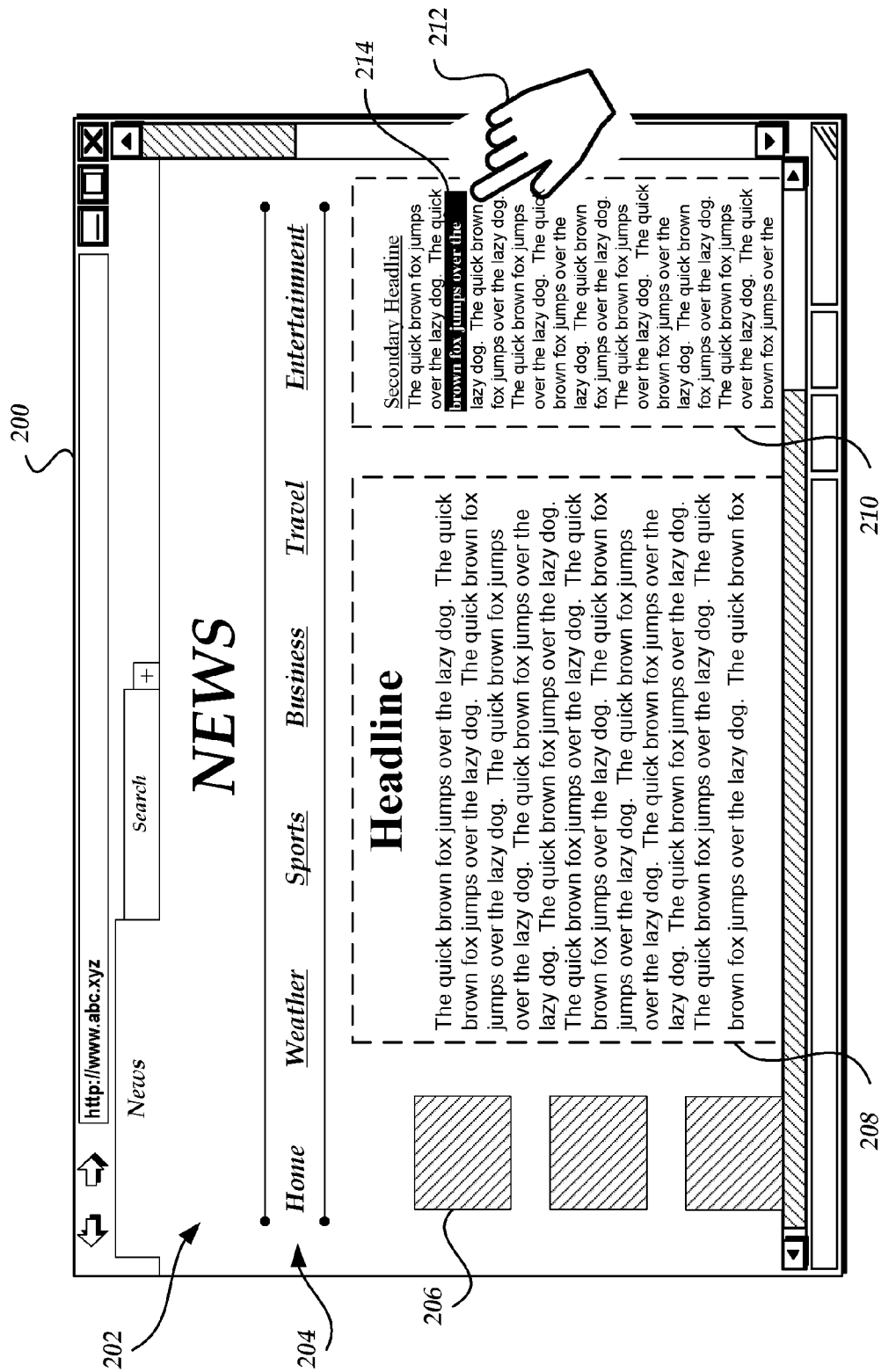
FIG. 2 illustrates an example content page processed according to some embodiments.
Figure 3:
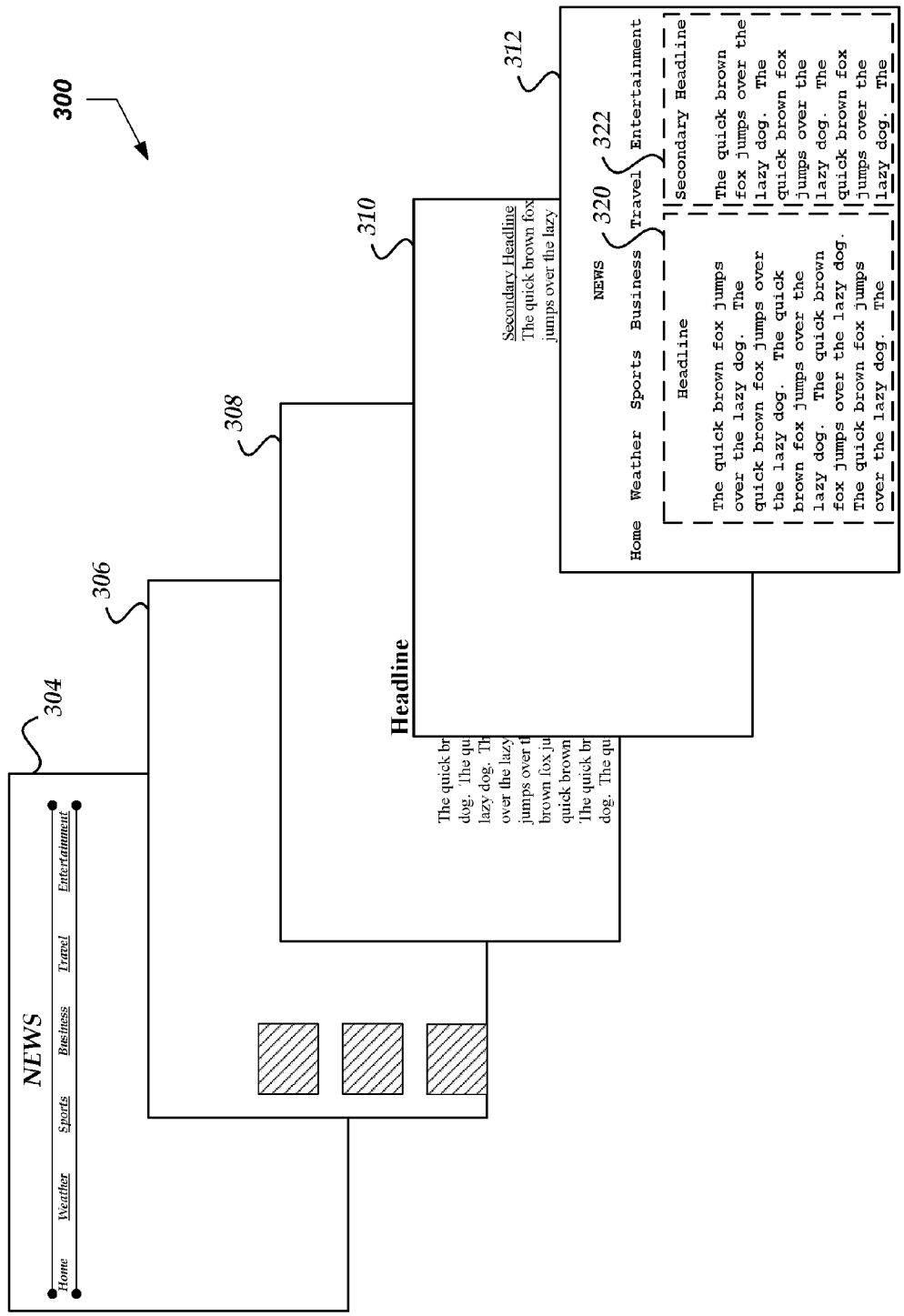
FIG. 3 illustrates example layers of a content page processed according to some embodiments.

FIGS. 2 and 3 show an example content page in two different views. The view shown in FIG. 2 is of a client-side browser interface 200 displaying a representation 202 of the content page using hardware-independent graphics commands received from an intermediary system 104 or some other server system. The view shown in FIG. 3 is of the various visual portions or "layers" 300 into which the content page may be separated. Individual layers may correspond to a discrete set of hardware-independent graphics commands operable to cause display of the corresponding visual portion. In addition, a separate invisible textual overlay 312 may be generated that is not displayed at the client-side browser 120, but which nevertheless may facilitate user interactions with images of text produced by execution of the hardware-independent graphics commands.

Figure 4:
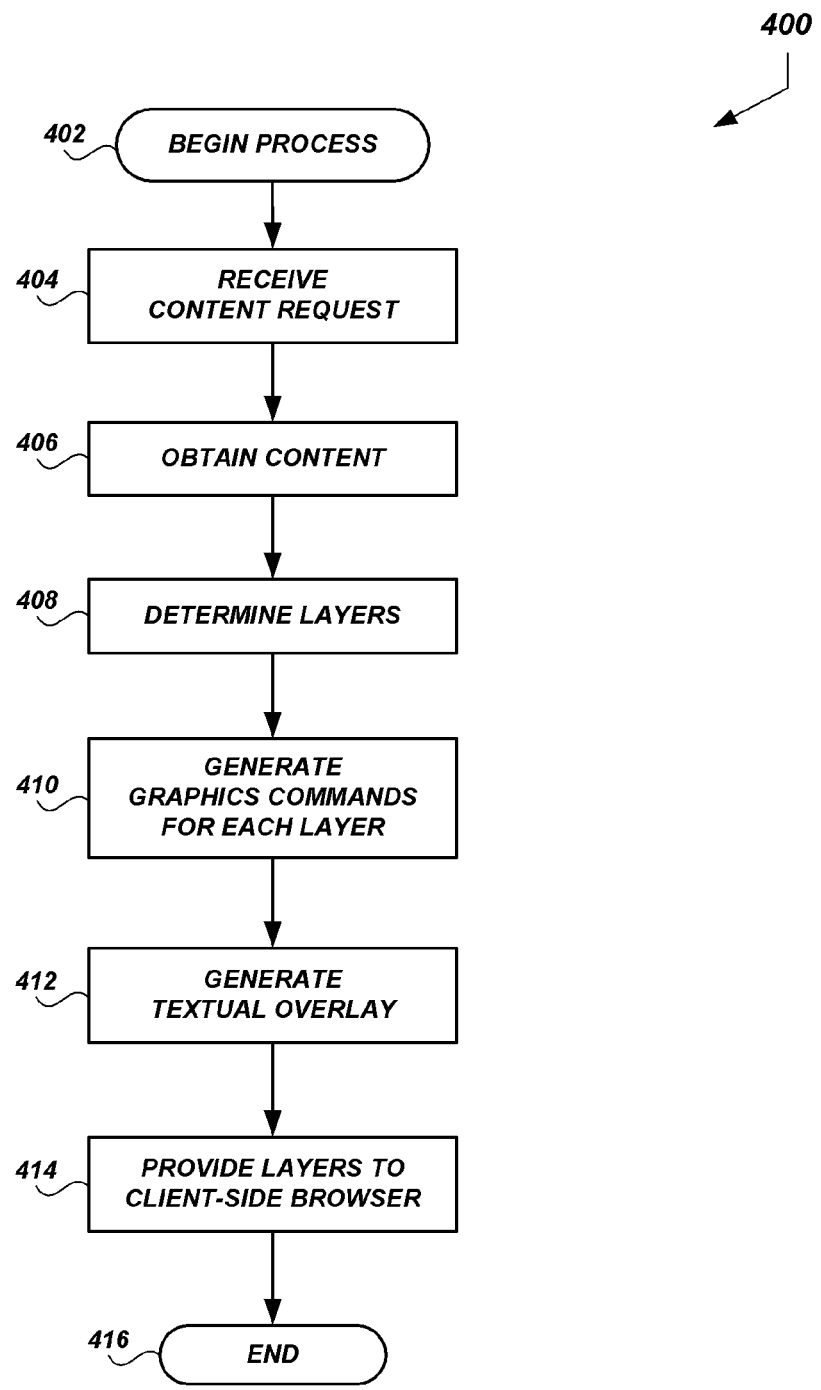
FIG. 4 is a flow diagram of an illustrative process for generating a response including hardware-independent graphics commands and a text overlay for a requested content page according to some embodiments.
Figure 5:
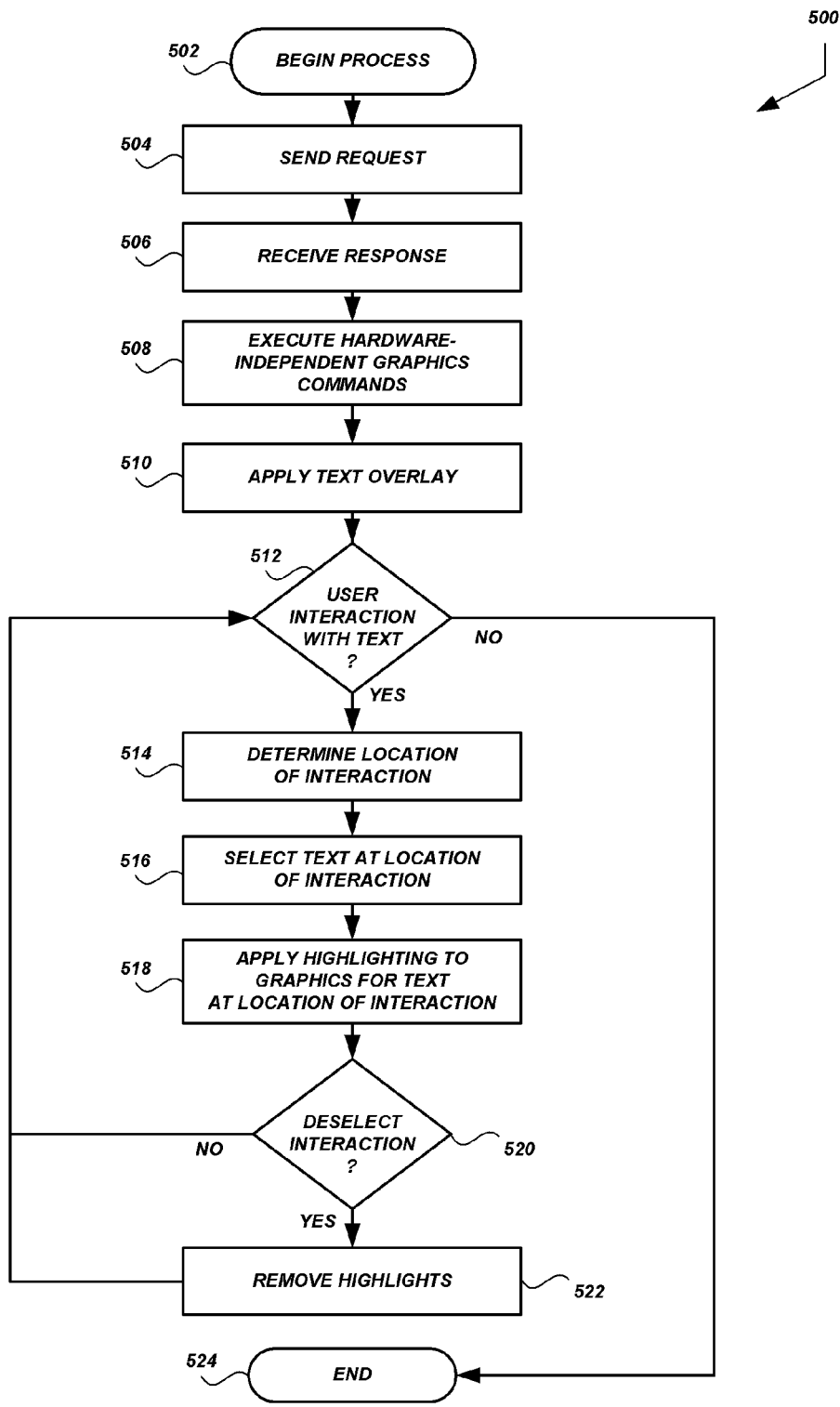
FIG. 5 is a flow diagram of an illustrative process for processing, on a client device, text interactions according to some embodiments.
Figure 6:
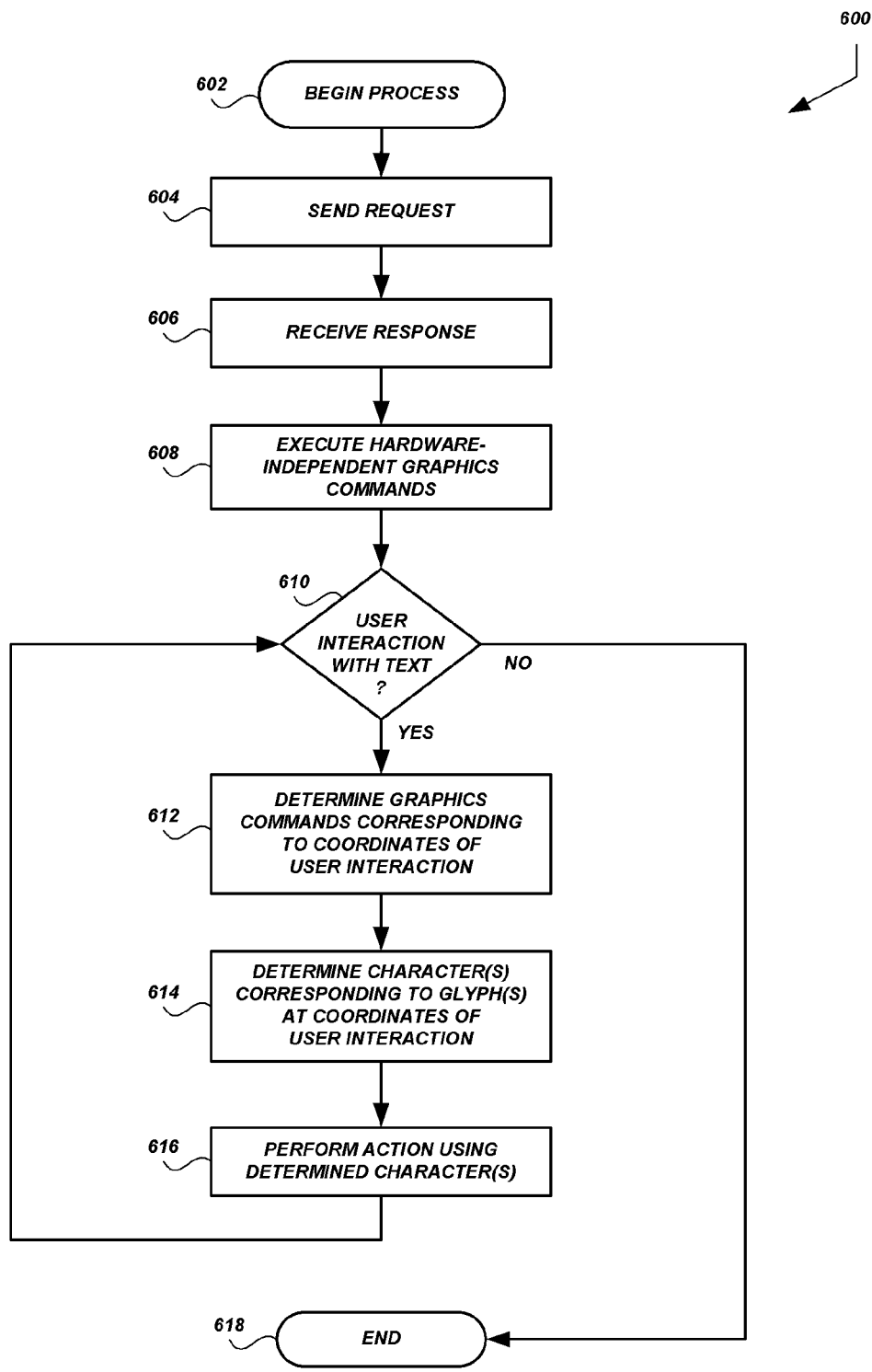
FIG. 6 is a flow diagram of another illustrative process for processing, on a client device, text interactions according to some embodiments.

The content page representations shown in FIGS. 2 and 3 and described below with respect to FIGS. 4, 5 and 6 are illustrative only, and are not intended to be limiting. In some embodiments, the content page may correspond to a base resource (e.g., an HTML page) and any number of embedded resources (e.g., images, videos, executable code files, and/or any other resources referenced by the HTML page) retrieved by the server-side browser 140 or some other module or component of a server system. For example, the content page representation 202 displayed by the client-side browser 120 may correspond to hardware-independent graphics commands generated by the intermediary system 104 in response to a request from a user device 102, retrieved from a client-side or server-side cache, etc.

FIG. 4 is a flow diagram of an illustrative process 400 that may be executed by a server system, such as the intermediary system 104, for retrieving content pages and generating hardware-independent graphics commands in response to content page requests. Advantageously, the intermediary system 104 may generate and provide a textual overlay with the hardware-independent graphics commands to facilitate user interactions with the text that would not otherwise be possible using glyphs or other images of text alone.

The process 400 begins at block 402. At block 404, the intermediary system 104 or other server system executing the process 400 can receive a request for network content, such as a content page, from a user device 102. The intermediary system 104 may instantiate a server-side browser 140 instance to process and respond to the request, or the intermediary system 104 may assign the request to an existing server-side browser 140 instance. In some embodiments, the client-side browser 120 may be assigned to a particular server-side browser 140 instance for an entire browsing session or some portion thereof, or the client-side browser 120 may be reconnected to a server-side browser 140 instance after a period of inactivity At block 404, the server-side browser 140 or some other module or component may obtain the requested content item. For example, the server-side browser 140 can retrieve a base resource, such as an HTML page, at a network address included in the request from the user device 102, from a server-side cache, etc. The server-side browser 140 can retrieve additional resources associated with the base resource, such as resources referenced within the base resource.

At block 406, the server-side browser 140 or some other module or component may segment the content page into multiple (e.g., two or more) layers. Each layer may correspond to a different visual portion of the content page, such as portion of the content page within a particular markup tag (e.g., "<div>," "<table>," etc.). If the server-side browser 140 were to generate a single set of hardware-independent graphics commands to display a representation of the entire content page, then hardware-independent graphics commands would need to be generated for the entire content page, including all objects displayed on the content page, each time a change to the display of one object is processed (e.g., each time a visual characteristic of a single object changes in response to user interaction, executable code, or some other event). This may be the case even if the display of no other object of the content page is to be changed. For example, if an image on a content page is the first image of a multi-image slide show, then hardware-independent graphics commands may need to be generated for the entire representation of the content page each time a new image is to be displayed. As another example, if a textual content area is to be scrollable while other objects are to remain stationary (e.g., a header), then hardware-independent graphics commands may need to be generated for the entire representation of the content page each time the textual content area is scrolled.

To avoid unnecessary processing by the server-side browser 140 and to reduce network traffic to the user device 102, one or more of the objects of the content page can be separated into a discrete layer. Different layers of a content page can encompass different two-dimensional areas of the content page (e.g., cover different ranges of coordinates without overlapping). In some cases, one layer may partially or completely overlap another layer (e.g., a background layer may be partially overlapped by any number of other layers, each of which may partially or completely overlap other layers, etc.). Hardware-independent graphics commands for individual layers can be generated such that they can be combined into a single representation by the client-side browser 120, while also allowing repainting of a single layer separately from the other layers of the content page. In this way, the representation of a single object can be updated separately from other objects and without re-processing and/or re-painting of the other objects. In some embodiments, as described above, the hardware-independent graphics commands may be Skia commands. Each individual layer may correspond to a different SkPicture, which includes Skia commands that can be executed to display a representation of the object. Individual SkPictures can be generated, stored, transmitted, executed, and updated independently from other SkPictures, even when multiple SkPictures are used to generate a single display on a user device 102.

The example content page shown in FIG. 2 includes a header 204, various images 206, and various textual content areas 208 and 210. Each of these distinct areas may correspond to a different layer, as shown in FIG. 3. For example, the server-side browser 140 may segregate the header 204 into its own layer 304, the images 206 into another layer 306, and each textual content area 208, 210 into its own layer 308, 310.

At block 410 of the process 400 shown in FIG. 4, the server-side browser 140 or some other module or component can generate hardware independent graphics commands for the various layers determined at block 408. For example, layers 308, 310 may be produced by generating graphics commands operative to display graphic representations or "glyphs" of the textual characters in the corresponding textual content areas 208, 210. A single letter, number, punctuation mark or other character may correspond to any number of different glyphs, depending upon the font in which the character is to be displayed, formatting effects to be applied (e.g., bold, underline, etc.) and the like. A hardware-independent graphics command (e.g., a Skia "drawText" command) can be generated for each individual textual character or group of characters. In this way, a client-side browser 120 in receipt of the hardware-independent graphics commands can paint an accurate image of the requested content page, including the textual portions of the content page, without receiving either the content page itself or an image of the content page.

Examples of systems and methods for segmenting a content page into layers and producing graphics commands for the individual layers are described in U.S. patent application Ser. No. 14/285,477, incorporated by reference above. In some embodiments, the server-side browser 140 may not separate the visual portions of the content page into multiple layers, but may instead generate a single discrete set of graphics commands, such as a single SkPicture, for the entire visual portion of the page (or for a substantial portion thereof).

At block 412, the server-side browser 140 or some other module or component can generate a textual overlay 312. In contrast to the layers of hardware-independent graphics commands generated in block 410 above, the textual overlay may include text in a format (e.g., Unicode or ASCII) that may be searched, copied, and otherwise used by the client-side browser 140 in response to text-based interactions. The term "overlay" refers to the position of the textual overlay with respect to the other layers when processed for display at the user device 102. Even though the textual overlay 312 may be invisible, it may still be logically positioned as the top-most layer (e.g., the layer with the highest z-index) when the content page representation is presented on the user device 102. Therefore, the textual overlay 312 may be the first or primary layer that handles user interactions with the representation of the content page, such as "drag" interactions to select text. In this way, the textual overlay 312 may provide or facilitate functionality similar to the textual interaction functionality provided by browser applications that retrieve conventional content files, including text, and render the text locally.

In some embodiments, the textual overlay may be a layout-aware invisible overlay that includes each textual character of the content page (or some subset thereof) arranged to correspond to the display location of the glyph for the character, or otherwise associated with location information to determine the location of the corresponding glyph. For example, the location information in the overlay may identify the coordinate(s) at which each text character or group of characters is displayed. When a user interacts with the content page representation to, e.g., select text, the operating system or some other module or component of the user device 102 can provide location information of the user interaction (e.g., coordinates of where the user tapped, dragged, etc.) to the client-side browser 120. The client-side browser 120 may then use the location information of the user interaction determine which text characters in the textual overlay correspond to the location of the user interaction. In some embodiments, the textual overlay may group text for individual layers such that handling of cursor dragging and other interactions may appear to the to the user in the same or substantially the same way that such interactions appear in browser applications that receive conventional content files and render text locally. For example, individual portions of a content page enclosed in "<div>" tags in an HTML file may be separated into different layers above at block 408. In the content page shown in FIG. 2, textual areas 208 and 210 may be enclosed in different "<div>" tags (or "<table>" tags, or "<p>" tags, etc.). Accordingly, these textual areas 208 and 210 may be segmented into different layers 308 and 310. The textual overlay 312 may arrange the text or include information that separates the text from layers 308 and 310 into different regions 320, 322. Such a layout-aware textual overlay 312 can be generated so that a user interaction such as "dragging" a finger or mouse pointer across text in one layer (e.g., layer 306 corresponding to region 320 of the textual overlay 312) does not inadvertently cause text to be selected in other layers (corresponding to other "<div>" tags) located in the path of the drag (e.g., layer 310 corresponding to region 322 of textual overlay 312), or to layers located behind the layer in which the user initiated the drag. In this way, any highlighting effect and/or copied text may be predictable and conform to user expectations for such interactions.

Although the term "overlay" is used throughout the present disclosure, in some embodiments text and location information may be generated by the server-side browser 140 and used by the client-side browser 120 without being logically layered on top of the content page representation displayed by the hardware-independent graphics commands. For example, text and location information may be provided as a data package or stream that is transmitted to client side browser 120 along with (or independently of) the hardware-independent graphics commands for a requested content page, and may not be processed as the top-most layer of the content page. The client-side browser 120 may be programmed to use the text and location information to facilitate text-based interactions, as described herein.

At block 414, the server-side browser 140 or some other module or component can provide a response to the content request received above at block 404. The response can include the hardware-independent graphics commands generated for the individual layers of the content page (or for the entire page), and the textual overlay generated above at block 412. The process 400 may then terminate at block 416. In some embodiments, the server side browser 140 may maintain an instance of the content page after providing the response to the user device 102. The instance can be used to generate updated layers in response to changes in visual portions of the page, such as changes caused by user interaction, executable code (e.g., JavaScript), and other events.

FIG. 5 is a flow diagram of an illustrative process 500 that may be executed by a client-side browser 120 for obtaining a network-accessible content item in the form of hardware-independent graphics commands. The client-side browser 120 can display a representation of the content item by executing the received graphics commands. Advantageously, the client-side browser 120 may also receive a textual overlay that includes the text that corresponds to certain portions of the content page. The client-side browser 120 can use the textual overlay to facilitate interactions with the text that would not otherwise be possible using glyphs or other images of text alone.

The process 500 begins at block 502. At block 504, the client-side browser 120 can send a request for network-accessible content to a server system, such as the intermediary system 104. At block 506, the client-side browser 120 can receive a response from the intermediary system 104. The response may include hardware-independent graphics commands in lieu of conventional content files for the requested content page. At block 508, the client-side browser 120 can execute the hardware independent graphics commands to display a representation of the requested content page.

At block 510, the client-side browser can apply or otherwise associate a textual overlay 312, received with the hardware-independent graphics commands, to the content page representation. Applying or associating the textual overlay 312 may include logically positioning the overlay on top of the rest of the content page representation. In this way, the overlay 312 is the first or primary layer used to handle user interactions with the representation of the content page. For example, user interactions such as "drag" operations may initially be processed by the operating system of the user device 102. The operating system can notify the application that is active at the time of the user interaction; in this example, the application is the client-side browser 120. The client side browser 120 may then determine how to handle certain interactions, such as touch/tap/mouse clicks/drags/etc., by determining which layer is the top-most layer at the location of the interaction.

At decision block 512, the client-side browser 120 can determine whether a current user interaction to select, highlight, or otherwise interact with text has been received. Illustratively, the interaction may include a user tapping on a portion of the display and dragging a finger across a line of text. FIG. 2 shows one example of such an interaction. As shown, a user's hand 212 has tapped a portion of the screen in which textual content area 210 is displayed. The user has dragged the hand 212 across a line of text 214. The operating system or some other module or component of the user device 102 can notify the client-side browser 120 of the interaction, and the process 500 may proceed to block 514.

At block 514, the client-side browser 120 can determine the location of the user interaction, such as the coordinates that correspond to the selected text 214. For example, the coordinates can be obtained from the operating system or some other module or component of the user device 102 (e.g., in connection with the notification described above).

At block 516, the client-side browser 120 can use the location information regarding the user interaction to identify the text in the textual overlay that corresponds to the user interaction. The client-side browser 120 can then add the identified text to the system clipboard or perform some other textual operation. In some embodiments, the text in the textual overlay that corresponds to the user interaction may be the text that is located at (or otherwise associated with location information that is equivalent or substantially equivalent to) the location of the user interaction. In other embodiments, the text in the textual overlay that corresponds to the user interaction may be the text that is located at (or otherwise associated with location information equivalent or substantially equivalent to) the location of the glyphs or other graphical representations of text displayed at or near the location of the user interaction.

At block 518, the client-side browser 120 can apply highlighting to the glyphs at the location that corresponds to the user interaction. For example, the client-side browser 120 can swap the background and font colors for the selected region or otherwise apply highlighting by modifying a parameter of the hardware-independent graphics commands used to display the glyphs (e.g., by modifying or substituting the "paint" object passed to a Skia "drawText" command). In some embodiments, highlighting may be generated by the server-side browser 140. For example, the client-side browser 120 may provide information regarding the user interaction and the location thereof to the server-side browser 140, and the server-side browser 140 may generate updated hardware-independent graphics commands for the entire page or some portion thereof (e.g., the layer associated with the user interaction) operable to display highlighted text when received and executed by the client-side browser 120.

At decision block 520, the client-side browser 120 can determine whether a de-selection interaction has been made. For example, a user may click or tap on a display location away from the highlighted text. In this example, the process 500 can proceed to block 522, where the highlighting is removed from the glyphs by, e.g., executing the graphics commands for the highlighted location as previously received above at block 506. However, the previously selected/highlighted text may remain in the clipboard until replaced or until the occurrence of some other event. Therefore, the user may paste the previously selected text even after de-selecting it.

FIG. 6 is a flow diagram of another process 600 that may be executed by a client-side browser 120 for obtaining a network-accessible content item in the form of hardware-independent graphics. In contrast to the process 500 described above, the client-side browser 120 executing the process 600 may not receive a textual overlay that includes text and location information. Instead, the client-side browser 120 may determine the text at a given display location by inspecting the hardware-independent graphics commands that correspond to the location. If the graphics commands include a command to display a glyph for a given glyph identifier, the textual character that corresponds to that glyph ID can be determined. In this way, the client-side browser 120 may provide text interaction functionality without obtaining a copy of the text that is included in content page.

The process 600 begins at block 602. At block 604, the client-side browser 120 can send a request for network-accessible content to a server system, such as the intermediary system 104. At block 606, the client-side browser 120 can receive a response from the intermediary system 104.

The response may include hardware-independent graphics commands in lieu of conventional content files for the requested content page. At block 608, the client-side browser 120 can execute the hardware independent graphics commands to display a representation of the requested content page.

At decision block 610, the client-side browser 120 can determine whether a current user interaction to select, highlight or otherwise interact with text has been received, such as one of the interactions described above. If so, the process 600 can proceed to block 612.

At block 612, the client-side browser 120 can determine the graphics commands that correspond to the coordinates of the user interaction. For example, the client-side browser 120 can receive location information from the operating system or some other module or component of the user device 102, as described in detail above. The client-side browser can use the interaction location information to inspect the graphics commands received in block 606 and identify the commands used to paint the portion of the display with which the user has interacted.

At block 614, the client-side browser 120 can determine the characters that correspond to the glyphs painted in the portion of the display with which the user has interacted. The client-side browser 120 may execute a function provided by the hardware-independent graphics command library to determine the character that corresponds to a given glyph ID. In some embodiments, the client-side browser 120 can use a cross-reference list or data store to determine which character corresponds to a given glyph ID.

At block 616, the client-side browser 120 can perform some action using the character(s) determined above. For example, the client-side browser 120 can place the determined character(s) into a temporary "clipboard" to be pasted in the future. As another example, the client-side browser 120 may apply or remove highlighting to the glyphs that correspond to the user interaction, as described in detail above.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability of hardware and software, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes 400, 500 and 600 described with respect to FIGS. 4-6 may be embodied in a set of executable program instructions stored on one or more non-transitory computer-readable media, such as one or more disk drives or solid-state memory devices, of the user device 102 or a computing system with which the intermediary system 104 is associated. When a process 400, 500 or 600 is initiated, the executable program instructions can be loaded into memory, such as RAM, and executed by one or more processors of the user device or computing system. In some embodiments, the computing system may include multiple computing devices, such as servers, and the processes or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to act as an intermediary between user devices and content servers, the system comprising one or more hardware computing devices, wherein the system is programmed to at least:
   receive, from a user device, a request for a content page hosted by a content server, wherein the user device and content server are separate from the one or more hardware computing devices of the system;
   obtain the content page, wherein at least a portion of the content page comprises text;
   generate, based at least partly on the content page, hardware-independent graphics commands operative to cause display of a representation of the content page when executed, the representation including one or more glyphs corresponding to the text of the content page, wherein the hardware-independent graphics commands comprise commands for generating a display;
   generate a textual overlay comprising the text of the content page and location information indicating a display location of each of the one or more glyphs corresponding to the text of the content page; and
   in response to the request for the content page, transmit the hardware-independent graphics commands and textual overlay to the user device over a network.

2. The system of claim 1, wherein the hardware-independent graphics commands comprise software abstraction layer commands that are not graphics processing unit-specific.

3. The system of claim 1, wherein the textual overlay comprises an invisible textual overlay that is not to be displayed at the user device.

4. The system of claim 1, wherein the textual overlay comprises layout information indicating a first portion of the text is separate from a second portion of the text.

5. The system of claim 1, wherein the hardware-independent graphics commands comprise Skia commands.

6. The system of claim 1, further programmed to at least execute a server-side browser application, wherein the server-side browser application generates the hardware-independent graphics commands.

7. The system of claim 1, further programmed to generate a plurality of layers of hardware-independent graphics commands, wherein layers of the plurality of layers correspond to different portions of the content page, and wherein layers of the plurality of layers are updateable independently of other layers of the plurality of layers.

8. Non-transitory computer storage having stored thereon a browser module configured to execute a process on a user computing device, the process comprising:
   transmitting a request for a content page to a server system;
   receiving, from the server system, hardware-independent graphics commands;
   executing the hardware-independent graphics commands to display a representation of the content page on the user computing device, the representation including a graphical representation of text of the content page;
   determining a hardware-independent graphics command used to generate a portion of the graphical representation of the text;
   determining a text character associated with the hardware-independent graphics command, wherein the text character is represented by the portion of the graphical representation of the text; and
   processing, using the text character, a user interaction with the representation of the content page.

9. The non-transitory computer storage of claim 8, wherein the browser module comprises one of: an application; a browser plug-in, or a browser extension.

10. The non-transitory computer storage of claim 8, wherein the hardware-independent graphics commands comprise software abstraction layer commands that are not graphics processing unit-specific.

11. The non-transitory computer storage of claim 8, wherein processing the user interaction with the content page comprises determining that the portion of the graphical representation of text is displayed at a location selected by the user interaction.

12. The non-transitory computer storage of claim 8, wherein determining the text character comprises using one of a cross reference or a function that returns a text character based at least partly on a glyph identifier.

13. The non-transitory computer storage of claim 8, wherein processing the user interaction with the content page comprises adding the text character to a clipboard.

14. The non-transitory computer storage of claim 8, wherein processing the user interaction with the content page comprises applying highlighting to a graphical representation of the text character displayed at a location selected by the user interaction.

15. The non-transitory computer storage of claim 8, wherein processing the user interaction with the content page comprises determining that the text character corresponds to one or more search terms.

16. The non-transitory computer storage of claim 8, wherein the graphical representation of the text does not include data recognized by the user computing device as a character data type.

17. A computer-implemented method comprising:

as implemented by one or more server computing devices configured to execute specific instructions, obtaining, in response to a request from a user device separate from the one or more server computing devices, a content page, wherein at least a portion of the content page comprises text;

generating, based at least partly on the content page, hardware-independent graphics commands that, when executed on the user device, will cause the user device to display a representation of the content page, the representation comprising one or more graphical representations of the text of the content page, wherein the hardware-independent graphics commands comprise commands for generating a display;

generating text information regarding the text of the content page; and in response to the request for the content page, transmitting the hardware-independent graphics commands and the text information to the user device.

18. The computer-implemented method of claim 17, wherein the one or more server computing devices are part of a system that acts as an intermediary between user devices and content servers.

19. The computer-implemented method of claim 17, wherein the hardware independent graphics commands comprise software abstraction layer commands that are not graphics processing unit-specific.

20. The computer-implemented method of claim 17, wherein the text information comprises a textual overlay, the textual overlay comprising at least a portion of the text of the content page.

21. The computer-implemented method of claim 20, wherein the textual overlay comprises location information indicating a display location of the one or more graphical representations of the text of the content page.

22. The computer-implemented method of claim 20, wherein the textual overlay comprises layout information indicating a first portion of the text is separate from a second portion of the text.

23. The computer-implemented method of claim 17, wherein the one or more graphical representations of text comprise one or more glyphs not recognized by the user computing device as a character data type.

24. The computer-implemented method of claim 17, further comprising generating a plurality of layers of hardware independent graphics commands, wherein layers of the plurality of layers correspond to different portions of the content page, and wherein layers of the plurality of layers are updateable independently of other layers of the plurality of layers.

* * * * *